United States Patent [19]

Jakobson et al.

[11] Patent Number: 4,508,058
[45] Date of Patent: Apr. 2, 1985

[54] MILKING METHOD AND AN APPARATUS THEREFOR

[75] Inventors: Sten Jakobson, Södertälje, Sweden; Karl Rabold, Schwäbisch Hall, Fed. Rep. of Germany

[73] Assignee: Alfa-Laval AB, Tumba, Sweden

[21] Appl. No.: 480,575

[22] Filed: Mar. 30, 1983

[30] Foreign Application Priority Data

Apr. 8, 1982 [SE] Sweden ............................ 8202278

[51] Int. Cl.³ .......................... A01J 5/00; A01K 1/12
[52] U.S. Cl. ............................. 119/14.02; 119/14.04; 119/51 R
[58] Field of Search ............... 119/14.02, 14.03, 14.04, 119/51 R

[56] References Cited

U.S. PATENT DOCUMENTS

| | | | |
|---|---|---|---|
| 3,557,758 | 1/1971 | Lack | 119/51 R |
| 4,000,718 | 1/1977 | Brown | 119/14.03 |
| 4,010,714 | 3/1977 | Notsuki et al. | 119/14.03 |
| 4,145,992 | 3/1979 | Rafaely | 119/14.04 |
| 4,223,635 | 9/1980 | Akerman | 119/14.02 |

*Primary Examiner*—Hugh R. Chamblee
*Attorney, Agent, or Firm*—Cyrus S. Hapgood

[57] ABSTRACT

The invention relates to a method of milking loose-housing cows which find their way individually to one or more feeding stalls where they are automatically identified and fed with the aid of a computer connected to the identification and feeding means.

The new feature resides in that the computer is used for recording of the points of time each cow is milked and to activate a device, in connection with the identification of a cow arriving at the feeding stall to eat, and provided that a predetermined time has passed after the preceding milking operation, which device is activated for automatic application of the milking means to the cow's udder and for starting a milking operation.

10 Claims, 12 Drawing Figures

MILKING METHOD AND AN APPARATUS
THEREFOR

The present invention relates to a method of milking cows which are allowed to go loose and find their way individually to one or more stalls arranged for feeding, in which the cows are automatically identified and fed with the aid of a computer connected to the identification and feeding means used.

At milk producers each cow is as a rule milked twice a day. However, research has shown that it is possible to increase the milk production by 15-25% by milking three or even four times per day and this without detriment to the cow. Considering primarily the increased labour cost caused by additional milking operations one has so far found it impossible to utilize said research observations since the increased labour cost would not be compensated for by the increased income produced by the milk addition.

The manual work in connection with milking is, also in modern plants, heavy and problematic from an ergonomic point of view. To reduce the risk of spinal affections, which often occur today, one has for instance suggested milk stations with a level difference between the space for the cow to be milked and the staff attaching and taking off the milking means. In spite of these and other improvements, which per se function satisfactorily, the milking work is felt strenuous.

Attempts have been made to replace parts of the manual handling by automatic means but so far these have not been successful, probably because they have only had marginal effects upon the costs.

The object of the invention is to provide a possibility to influence the milk production positively by additional milking occasions and in spite of this reduce considerably the need for supervising staff in connection with the milking by utilizing to the greatest possible extent automatically active means for attaching and taking off the milking means and also for other measures associated therewith.

To carry out the method according to the invention use is suitably made of already existing systems for automatic feeding of cows, making it possible to identify every cow and to administer, according to predetermined standards, an adjusted amount of food to the cow when coming to the feeding place.

The essential characteristic of the new method resides in that the computer is utilized, on one hand, to record the points of time at which every cow is milked and, on the other hand, to activate a device, in connection with the identification of a cow finding her way to a feeding stall to eat, and provided that a predetermined time has passed after the cow in question was last milked, which device is activated for automatic application of the milking means to the udder of the cow and for starting a milking operation, while the cow is prevented from leaving the stall during milking.

According to the known feeding method each cow is provided with a so-called transponder, i.e. a codable signal emitter attached to a necklace. By the transponders a sensing means placed adjacent the feeding station is actuated and this means is in its turn coupled to a computer which senses which individual is visiting the feeding station and is adapted to dispense or not dispense a certain amount of food on the basis of data concerning the desired food ration and the food amount earlier consumed by one and the same individual up to that time of the day.

According to the invention use is made of a somewhat modified computer of that type with associated sensing means and transponders to record the points of time at which each cow is milked, said computer being adapted—in connection with the identification of a cow going to a feeding station to eat, and provided that a certain time has passed after the preceding milking operation—to activate, on one hand, a means for retaining the cow in the stall-like feeding place and, on the other hand, a means for automatic application of the milking means to the cow's udder and for starting the milking operation.

The new method also includes the feature that the computer is adapted to interrupt the milking process and to initiate automatic removal of the milking means from the cow's udder respectively after the predetermined milking time has expired and/or after the available milk quantity has been milked out.

Prior to the application of the milking means other means also controlled by the computer can be set in operation to clean and suitably also massage the teats.

The computer is also advantageously so constructed that it will effect retention of the cow only in case milking is desired and will release the cow after milking only when the milking means have been removed.

Means for automatic recording of milk quantity and temperature, means for sampling test volumes for checking with respect to bacterial content, the presence of mastitis and the like, can also be connected to the computer.

The objects indicated in the above introduction, i.e. increasing the milk production without therefore having to increase the labour costs, have been achieved by this invention. A good deal of the manual heavy work, which is inevitable in connection with conventional milking, has also been eliminated. The invention further permits milking independently of the time of the day.

Plants for automatic feeding of cows in loose-housing systems are used in many places and this invention permits completing such feeding plants so that also milking can be carried out in such plants. The need for specific milking parlours or stations is thus entirely eliminated.

For carrying out the method of the invention a specifically combined feeding and milking stall is made, having at its inner end a bowl or the like for the food. Shields are arranged in the stall in an appropriate manner and there are one or more means for retaining the cow.

The invention will be described more fully below with reference to the accompanying schematic drawings in which.

Details having identical or principally identical function have been provided with the same reference numerals in the drawings.

Figure 1:
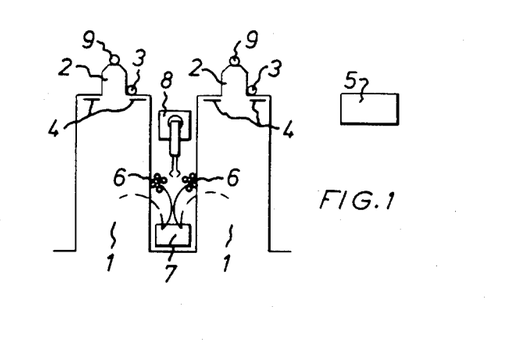
FIG. 1 is a top view of a principal embodiment of the apparatus.

A cow-house or an area intended for loose housing include two feeding and milking stalls 1 according to the embodiment shown in FIG. 1. Each stall is provided with a manger 2 and adjacent this there is a sensing means 3 and a retaining means 4 which in the embodiment shown consists of a so-called necklock.

The sensing means 3 are in a per se known manner adapted to give an identification signal to a computer 5 in response to a transponder carried by each cow. As soon as a cow arrives at the manger 2 of the stall 1 she will thus be identified.

In either stall 1 there is a unit 7 carrying milking means 6 and keeping them in position for service. The unit 7 is also adapted, in response to a signal from the computer after finished milking, automatically to take off the milking means, clean and return them to the service position.

The milking means 6 are in a per se known manner (not shown) connected to a milking plant, and connected to the milking means in either stall is the necessary regulating equipment which is controlled by the computer equipment and recording means for starting and shutting off the milking operation.

Between the stalls 1 there is a robot 8 adapted to apply the milking means 6 to the cow's teats in response to a signal from the computer 5.

The function of the apparatus according to this embodiment is in broad outline as follows.

When a cow goes into one of the stalls 1 she is identified and with the aid of the food administration means 9 she is given an amount of food which is adjusted with respect to a predetermined ration and the amount of food earlier administered to her.

If the memory of the computer indicates that a predetermined time has passed after the cow in question was milked, then the operating means for the retaining means 4 are activated so that the cow will be retained and brought to take a fixed position in the stall 1. After this the robot 8 is activated to move and direct the milking means 6 carried by the unit 7 towards the cow's teats to which the robot applies these means whereupon milking is started.

The apparatus is as a rule also provided with means for cleaning the teats and means for effecting massage of udder and teats to facilitate milking. There may be such means in each stall 1 but otherwise they may be in the form of a separate attachment to the robot or support unit. Where appropriate the cleaning means and massaging means are activated by the computer before the robot 8 applies the milking means.

When the milking means have been applied and the milking operation has started the manipulating means of the robot return to inactive position or the robot is activated to apply the milking means in the adjoining stall if there is a cow to be milked therein.

When the first-mentioned cow has been milked the unit 7 is activated under the influence of the computer 5 to take off the milking means 6 and the operating means for the retaining means 4 so that the cow can leave the stall.

Thus also the operating means for the retaining means 4 are controlled by the transponder carried by the cow in so far as they are closed only if milking is desired. If the cow only should have food or already has received the intended quantity no retention is required.

When the milking operation is finished it is time for the cow to leave the stall. As different cows may require different lengths of time for milking the milking process is recorded and the removal of the milking means and the release of the cow are controlled with the guidance of said recording.

When the cow has left the stall the next cow may go in, be identified and only be given food, or be given food, be retained and milked, or be given no food. In the latter case the cow leaves the stall.

Figure 2:
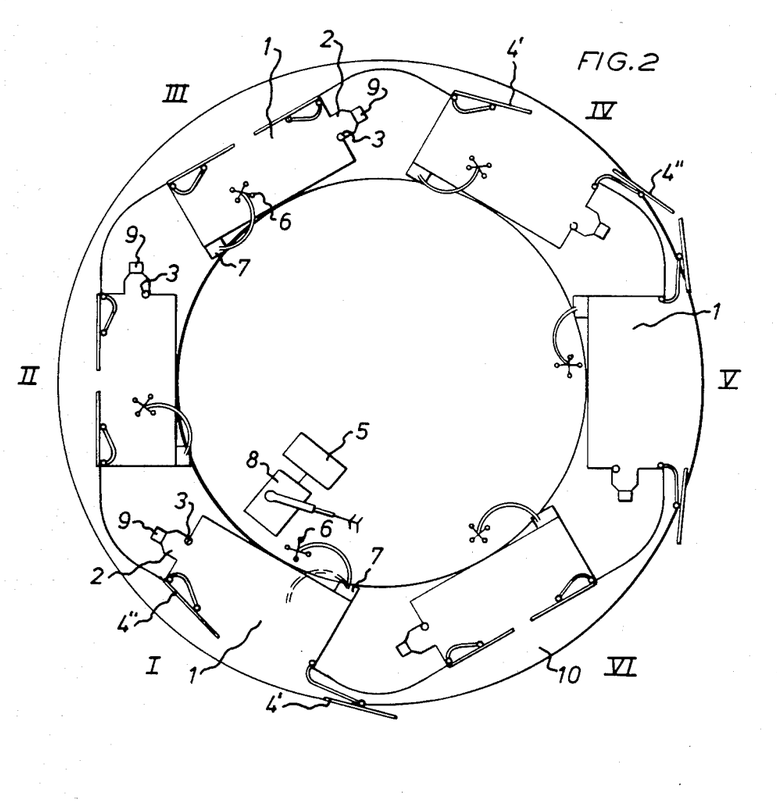
FIG. 2 is a top view of another embodiment.
Figure 3:
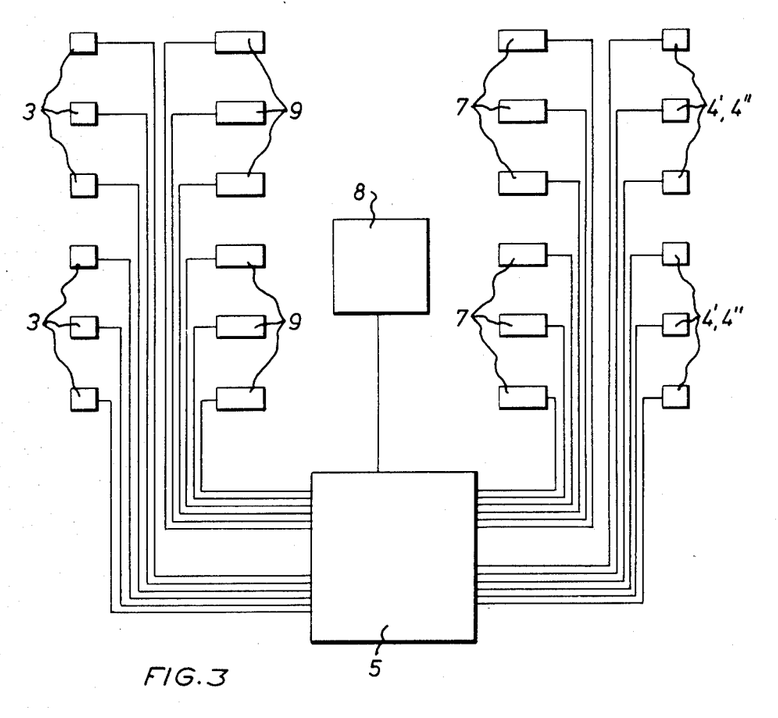
FIG. 3 is a diagram illustrating how the components of the embodiment according to FIG. 2 are connected to the computer.

In the embodiment according to FIGS. 2 and 3 a rotatable platform 10 is arranged at the level of the floor of a cow-house constructed for loose housing, said platform being rotary between positions I–VI, and a number of feeding and milking stalls 1, which are six in the embodiment shown, are arranged on the platform.

In each milking and feeding stall 1 there is a manger 2 with food dispensing means 9 and adjacent the manger there are sensing means 3 which in the mentioned manner, with the guidance of a transponder carried by the cow, give a signal to the computer equipment to permit identification of the cow entering the stall and activation of appropriate means.

For retaining the cow each stall is closable by means of gates or screens 4', 4'' which are adapted to bring the cow to take a defined position suitable for milking. In each stall 1 there is also a unit 7 carrying milking means 6 and functioning in the same manner as that described above. The milking means 6 are connected to a milking plant, which may be incorporated with the platform 10 and follow this or be stationary and be coupled by central connections in the platform to lines which in their turn are coupled to the milking means in each stall.

On a level with position I there is a stationary robot 8 adapted to apply the milking means 6 to the cow's teats. The computer, designated by 5, of the plant is intended to operate in principally the same way as the computer in the embodiment of FIG. 1 but it is also adapted to control the rotation of the platform 10.

In broad outline the function of this embodiment is as follows.

When a cow goes into the open stall 1 which is in position I the cow is identified and is given an amount of food adjusted with respect to a predetermined ration and to earlier given amount of food.

If it is found that a predetermined time has passed after the cow in question was milked then the operating means for the gates 4', 4'' are activated so that the cow is retained and brought to take a predetermined position in the stall 1. After this the robot 8 is activated to move and direct the milking means 6 carried by the unit 7 towards the cow's teats and apply these means whereupon milking is started.

Also the arrangement according to this embodiment may be provided with means for cleaning the teats and means for effecting massage of udder and teats to facilitate milking.

When the milking means 6 have been applied and the milking operation has started the manipulation means of the robot return to inactive position and—in case the platform is not continuously rotated—the driving means are actuated to turn the platform 1 so that this will advance one step.

When the next stall 1 attains position I the gates 4', 4" of the stall open so that the next cow can go into the stall, be identified and only receive food, or receive food, be retained and milked, or be left without food.

When the first-mentioned cow has passed the number of positions required for the length of the milking procedure and milking has been finished, the computer 5 activates the unit 7 to take off the milking means and the operating means for the gates 4', 4" so that the cow can leave the stall. Decisive for the point of time when the cow is to leave the stall is that the milking operation is finished. The operating means for the gates 4' and 4" are controlled, just as described above, by the transponder carried by the cow so that the gates will close only if milking is to be carried out.

In the illustrated embodiment the gates can be operated separately, whereby in position I the rear gate 4' is entirely open while the front gate 4" can be inclined to facilitate accommodation of the cow. In position IV where the cow is to leave the stall, the front gate 4" is entirely opened while the rear gate 4' is inclined. In this way it is possible to avoid crowding and wrong entering directions.

In apparatuses of this kind a considerable part of the cost falls on the robot 8 by means of which the application of the milking means 6 is carried out. In the embodiment of FIG. 1 one robot serves two stalls, in the embodiment of FIGS. 2 and 3 it serves six stalls. In principle it is also possible to have one robot serve one stall and take care of both the application and the removal of the milking means.

Figure 4:
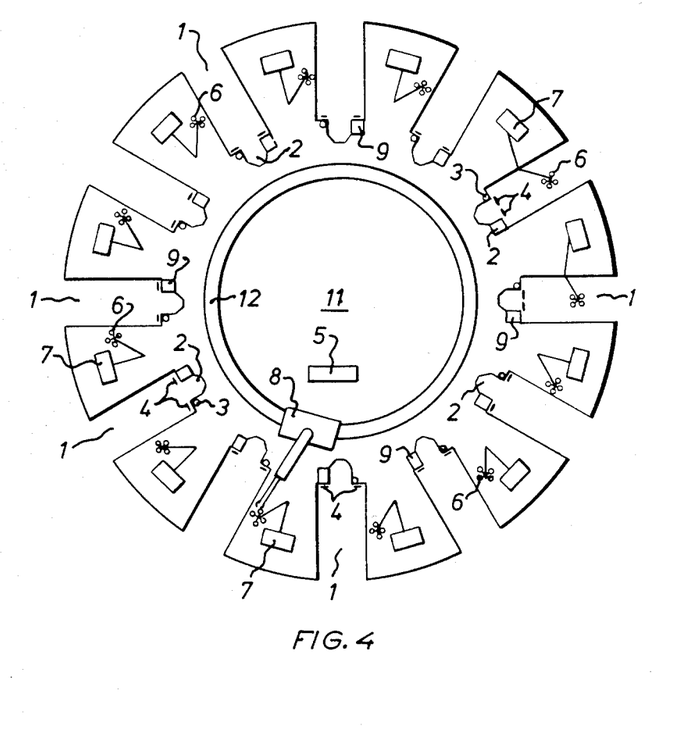
FIG. 4 is a top view of an embodiment applicable to large plants.

In the embodiment according to FIG. 4 one robot is allowed to serve twelve stalls. These stalls 1 are disposed ringwise around a central space 11. In each stall there is, just as before, a manger 2 with food dispensing means 9, sensing means 3 and retaining means 4, preferably in the form of a necklock. Support units 7 for carrying milking means 6 are arranged between the stalls 1. Arranged in the space 11 inside the stalls is a track 12 on which a robot 8, which in the manner mentioned is coupled to a computer 5, is adapted to travel.

The function of this embodiment differs from those described above in that the robot moves to a position adjacent said stall after a signal indicating that a cow to be milked has entered one of the stalls 1. In the meantime the cow has been given food and been locked up. The robot moves the milking means 6 from the service position and applies them to the teats of the cow. When this has been done the robot 8 moves to the next stall where there is a cow to be milked.

Robots designed for this purpose are for the most part based on the prior art as far as handling of the milking means is concerned and they may be completed with sensing means or the like with the aid of which fine adjustment of the milking means towards the teats is carried out.

To permit automation of the application of the milking means in an appropriate and reliable manner it is necessary first accurately to establish the position of the cow to be milked. This takes place by mechanical means. The cow's position in the longitudinal sense can be precisely defined, on one hand, because the cow's head is situated adjacent the manger 2 and, on the other hand, because the gates 4 are formed such as to prevent rearward movement. To ensure that the cow takes the desired transverse position the floors in the milking stall can be provided with a longitudinal ridge with inclined side faces which makes the cow stand constantly in a certain position.

By measuring, which can take place photographically or by means of measuring instruments, it is possible to arrive at an average value concerning the udder and teat positions of all the cows in the plant in question and this may serve as a rough adjustment position for the sensors arranged on the robot 8.

Figure 5:
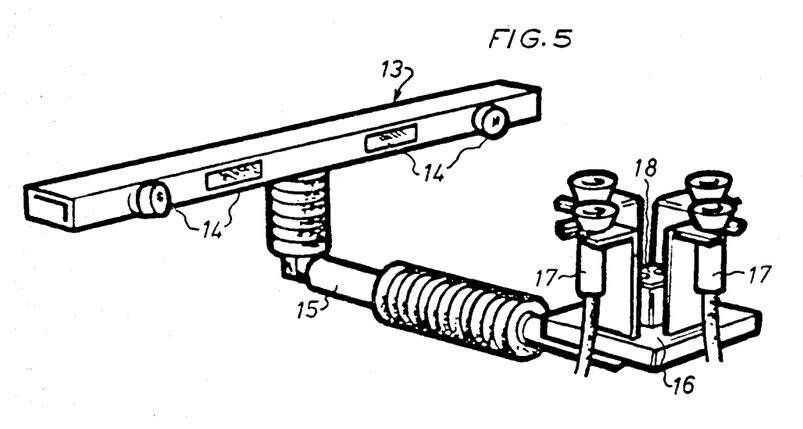
FIG. 5 is a diagonal perpective side view of a robot device for application of milking means.
Figure 6:
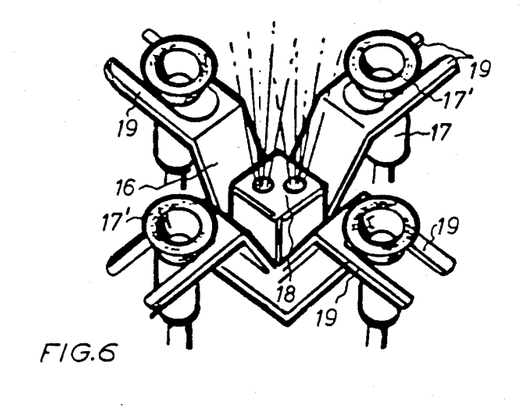
FIG. 6 is a diagonal top view showing on a larger scale part of the same device.

In FIGS. 5 and 6 there is shown an example of a robot device for use in this connection. The robot assembly 13, which is carried by one or more arms in a frame (not shown), including electronic components, operating motors and the like, comprises a first double sensor means 14, a pivotable and telescopically extensible arm 15 which carries a support 16 for milking means 17 and a second sensor means 18. To facilitate the application of the milking means these may be provided, as illustrated, with funnel-shaped guide means 17' which, in rest position on the support, are situated at the upper part of the milking means but, when the support is carried away, are displaced in downward direction towards the lower end of the milking means in order not to come into contact with the udder and obstruct milking.

Figure 7:
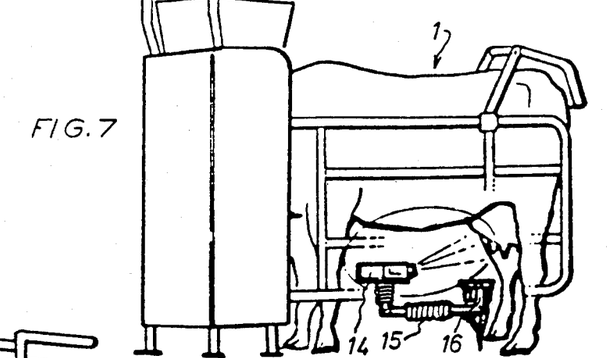
FIGS. 7, 8 and 9 illustrate various stages of an application operation, showing a cow in a stall with the robot device in various positions.
Figure 8:
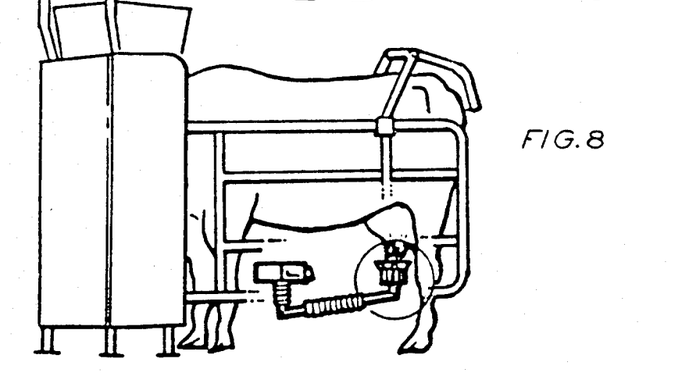
Figure 9:
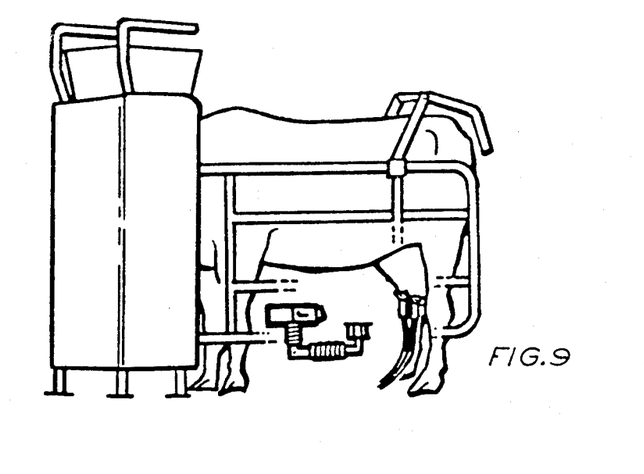

When a cow has entered the stall and takes the position shown in FIG. 7 and the computer 5 emits a signal that the cow is to be milked, the position for the teats in lateral and longitudinal senses is sensed by means of the first sensor means 14, whereupon the support 16 with the milking means 17 suspended in U-shaped parts 19 of the support is displaced by means of the arm 15 to a position straight below the cow's udder. After this the position of the teats in the vertical sense is sensed by means of the second sensor means 18, whereupon the milking means 17 are moved upwards by means of the support 16 until they attain the teats and are applied to these, as shown in FIG. 8. When this has been done the arm 15 with the support 16 is lowered and returns to rest position, FIG. 9. When the milking is finished a signal is emitted to the removing means which detaches the milking means from the teats and returns these means to the initial position on the support 16.

Figure 10:
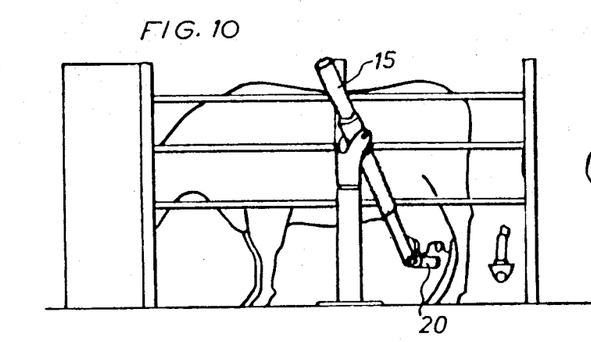
FIG. 10 is a side view of such a stall with a modified embodiment of the robot device.
Figure 11:
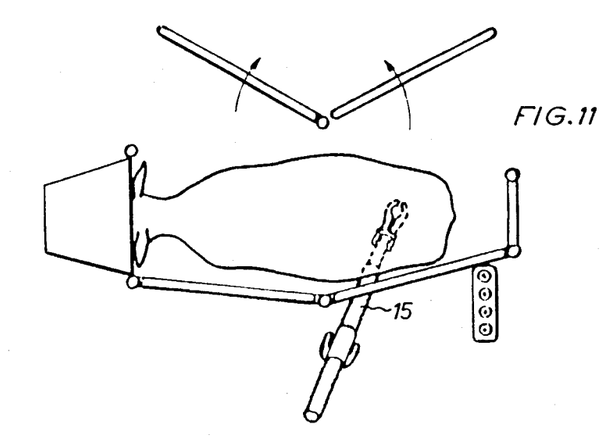
FIG. 11 is a top view of the stall according to FIG. 10.
Figure 12:
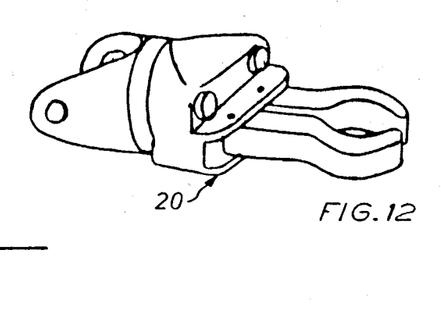
FIG. 12 shows a grasping means in the last-mentioned robot device.

FIGS. 10, 11 and 12 show an alternative embodiment of a device for handling the milking means. Instead of a support, which moves all the milking means simultaneously, use is made of an operating arm 15' which is controlled by sensors or the like and provided with grasping means 20, said arm being adapted to fetch the milking means, one by one, from an appropriately designed magazine and to apply said means to the teats.

The sensors are principally of known design and are not described in detail, and so are not either the operating and manipulation means.

The drawings and the specification do not specifically include certain obviously necessary details, such as safety means, interlocking means and the like.

The invention must not be considered restricted to the embodiments described above and shown in the drawings but may be modified in various ways within the scope of the appended claims.

What we claim and desire to secure by Letters Patent is:

1. A method of milking cows which are permitted to go loose and find their way individually to one or more stalls constructed for feeding, in which the cows are automatically identified and fed with the aid of a computer connected to the identification and feeding means used, wherein the computer is utilized, on one hand, to record the points of time at which every cow is milked and, on the other hand, to activate—in connection with the identification of a cow arriving at a feeding stall to eat, and provided that a predetermined time has passed after the cow in question was last milked—a device for automatic application of milking means to the udder of the cow and for starting a milking operation, while the cow is prevented from leaving the stall during milking.

2. A method as claimed in claim 1, wherein the computer is used to activate a means for retaining the cow in the stall, provided milking is to take place.

3. A method as claimed in claim 1 or 2, wherein the computer is used to activate means for cleaning the cow's udder and suitably also means for massaging the udder, provided milking is to take place.

4. A method as claimed in claim 1 or 2, wherein the computer is used to activate means for removing the milking means and releasing the cow, after milking is finished.

5. Apparatus for milking cows which carry respective identifying means and which are permitted to go loose, the apparatus comprising at least one stall to which a cow can find her way, sensing means at said stall operable by proximity of any of said identifying means to emit a signal identifying the corresponding cow, a computer operatively connected to the sensing means for receiving cow-identifying signals therefrom, feeding means at the stall operable by the computer in response to a said signal to dispense feed in an amount selected for the corresponding cow, milking means at the stall including teat cups, a robot operable by the computer to apply the teat cups to the teats of a cow in the stall, removal means at the stall for removing the teat cups from the cow upon completion of milking, the computer including means operable by a said signal to record a point in time when the corresponding cow was last milked, the computer also including means operable by a said signal for rendering the robot inoperative when less than a predetermined time period has elapsed since said point of time for the corresponding cow, and retaining means operable by the computer to retain a cow in the stall during milking of the cow.

6. The apparatus of claim 5, in which the robot is located adjacent two adjoining stalls and is operable to apply the teat cups to a cow in each stall.

7. The apparatus of claim 5, comprising also a rotary platform carrying a series of said stalls, each stall having a said milking means, said robot being located in a stationary position adjacent the platform and operable by the computer upon rotation of the platform to apply the teat cups of the respective milking means in succession to respective cows in the stalls.

8. The apparatus of claim 5, in which the robot includes means for sensing the distance to and the position of the teats, and manipulation means under control of said sensing means for moving and applying the teat cups.

9. The apparatus of claim 5, comprising also a track extending along a series of said stalls, each stall having a said said milking means, said robot being movable along said track and operable by the computer to apply the teat cups of the respective milking means in succession to respective cows in the stalls.

10. The apparatus of claim 9, in which the stalls of said series are arranged in substantially a circle, said track being substantially circular.

* * * * *